Figure 1:
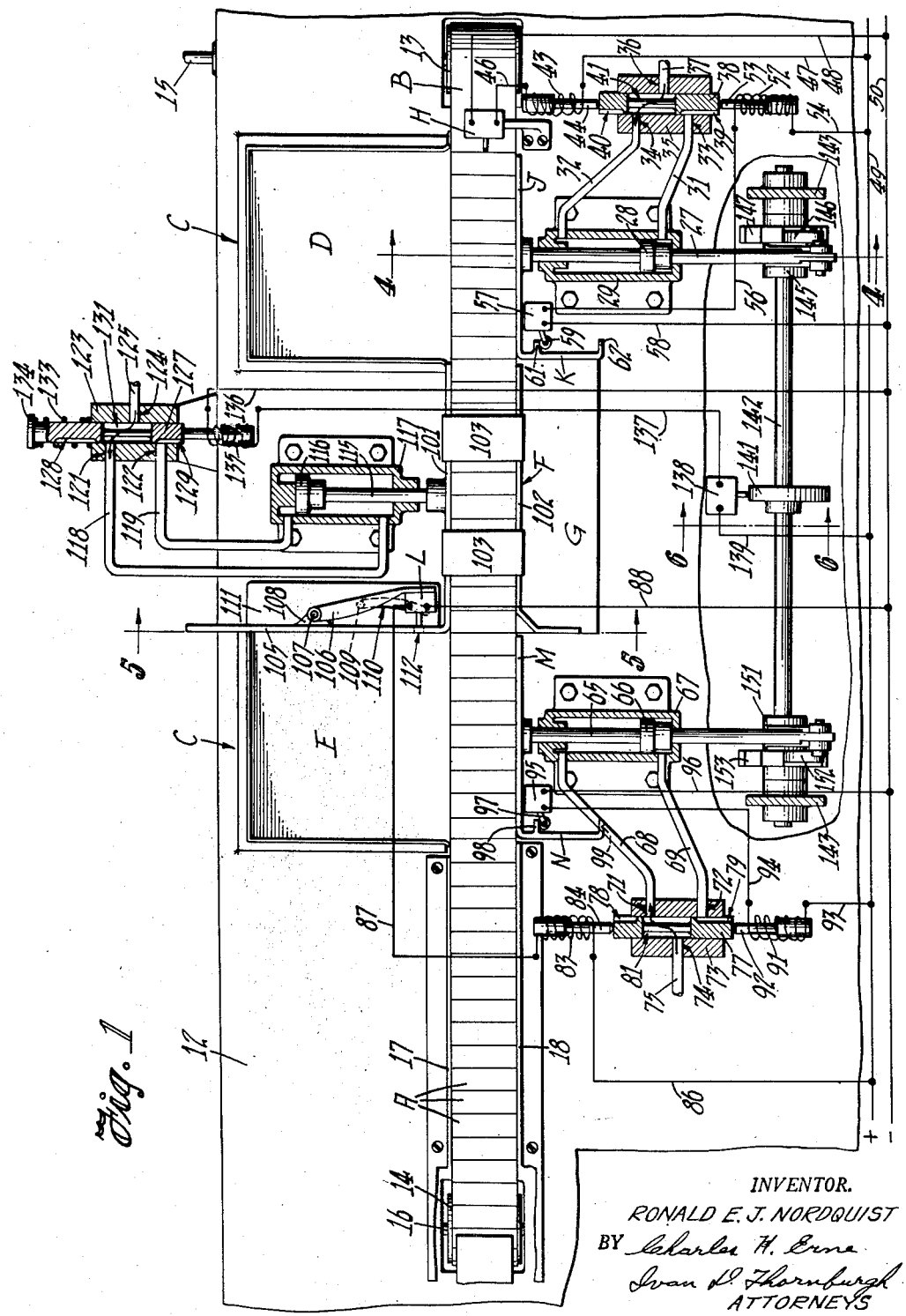

Jan. 4, 1955 R. E. J. NORDQUIST 2,698,693
MACHINE FOR ASSEMBLING ARTICLES IN UNIT
LAYERS AT SUCCESSIVE STATIONS
Filed Dec. 29, 1950 4 Sheets-Sheet 4

INVENTOR.
RONALD E. J. NORDQUIST
BY Charles H. Erne
Ivan D. Thornburgh
ATTORNEYS

United States Patent Office 2,698,693
Patented Jan. 4, 1955

2,698,693

MACHINE FOR ASSEMBLING ARTICLES IN UNIT LAYERS AT SUCCESSIVE STATIONS

Ronald E. J. Nordquist, Maplewood, N. J., assignor to American Can Company, New York, N. Y., a corporation of New Jersey Application December 29, 1950, Serial No. 203,423

11 Claims. (Cl. 214—6)

The present invention relates to a machine for receiving articles in a continuous procession and assembling them in unit layers for packaging and has particular reference to devices for feeding articles to a plurality of assembly stations in alternate timed order.

In the container manufacturing plants empty containers are usually shipped and stored in sealed paper bags for convenience in handling and to keep the containers clean during transportation. For best results in making a firm and compact package, the containers are arranged in the bag in an orderly manner, the containers being stacked in a plurality of layers or tiers. In some cases the layers of containers are built up in the bag by the progressive assembling of individual rows of containers in the bag. In other cases, rows of containers are assembled into a layer unit and the unit placed in the bag. In still other cases an entire stack of a plurality of layers of containers sufficient to fill the bag is built up as a unit and the unit placed in the bag.

In any case, after the bag is filled with containers, it is removed for sealing and an empty bag is arranged in proper position for filling. During this period in which the filled bag is removed and another empty bag is arranged for filling, feeding of the containers for assembly into layers must stop. Since the containers usually are fed direct from the container making machine, any stoppage at the bag filling machine interferes with continued operation of the container making machine and thus causes inefficient operation of the entire line.

The instant invention contemplates the provision of a machine for assembling articles, for example the empty containers above mentioned, into layers preparatory to packing, in such a manner as to permit feeding of the articles in a continuously moving procession. Toward this end a plurality of article assembly stations are provided with control devices at each station to provide for continuous loading of the articles at one or another of the stations. In such a machine the articles are loaded or assembled into layer formation at one station while the other stations are free for unloading. Thus the entering feed line or procession of articles is always kept moving into the stacking machine.

An object of the invention is the provision of a machine for assembling articles in unit layers for packaging wherein a plurality of assembly stations are provided so that one station can be loading while the others are being unloaded to provide for the removal of the assembled units without in any manner interfering with the continuous feeding of the articles into the machine.

Another object is the provision of such a machine wherein unit rows of articles may be repeatedly removed from a substantially continuous procession, first at one station and then at another station, to build up unit layers of articles at each station successively, without in any manner interfering with the feeding of the articles into the machine.

Another object is the provision of such a machine wherein the repeated operations at each station to build up a unit layer of articles at that station is effected by the articles themselves so that the building up of a unit layer of articles at the stations and the shifting of operations from one station to another is under the control of the articles in the procession.

Another object is the provision of such a machine wherein the terminal point of the leading article in the procession may be shifted from one assembly station to another to facilitate loading of the articles into the stations in a predetermined order.

Another object is the provision of such a machine wherein all articles located between stations when a shift in terminal points is required, are cleared from the procession to establish a new terminal point and are returned to the procession subsequently for the establishment of an advanced terminal point to facilitate loading of the different assembly stations in successive order.

Numerous other objects and advantages of the invention will be apparent as it is better understood from the following description, which, taken in connection with the accompanying drawings, discloses a preferred embodiment thereof.

Figure 2:
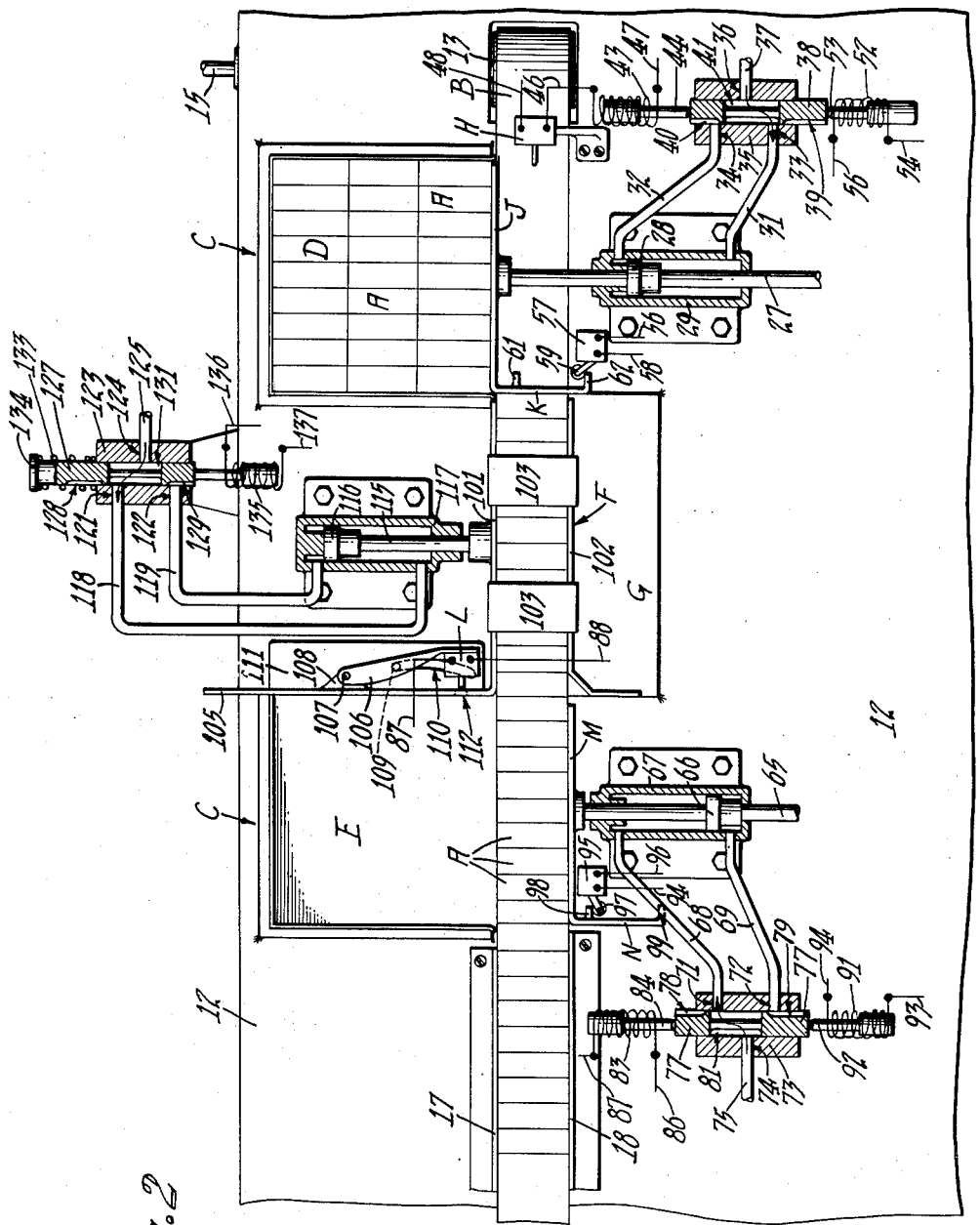
Figure 3:
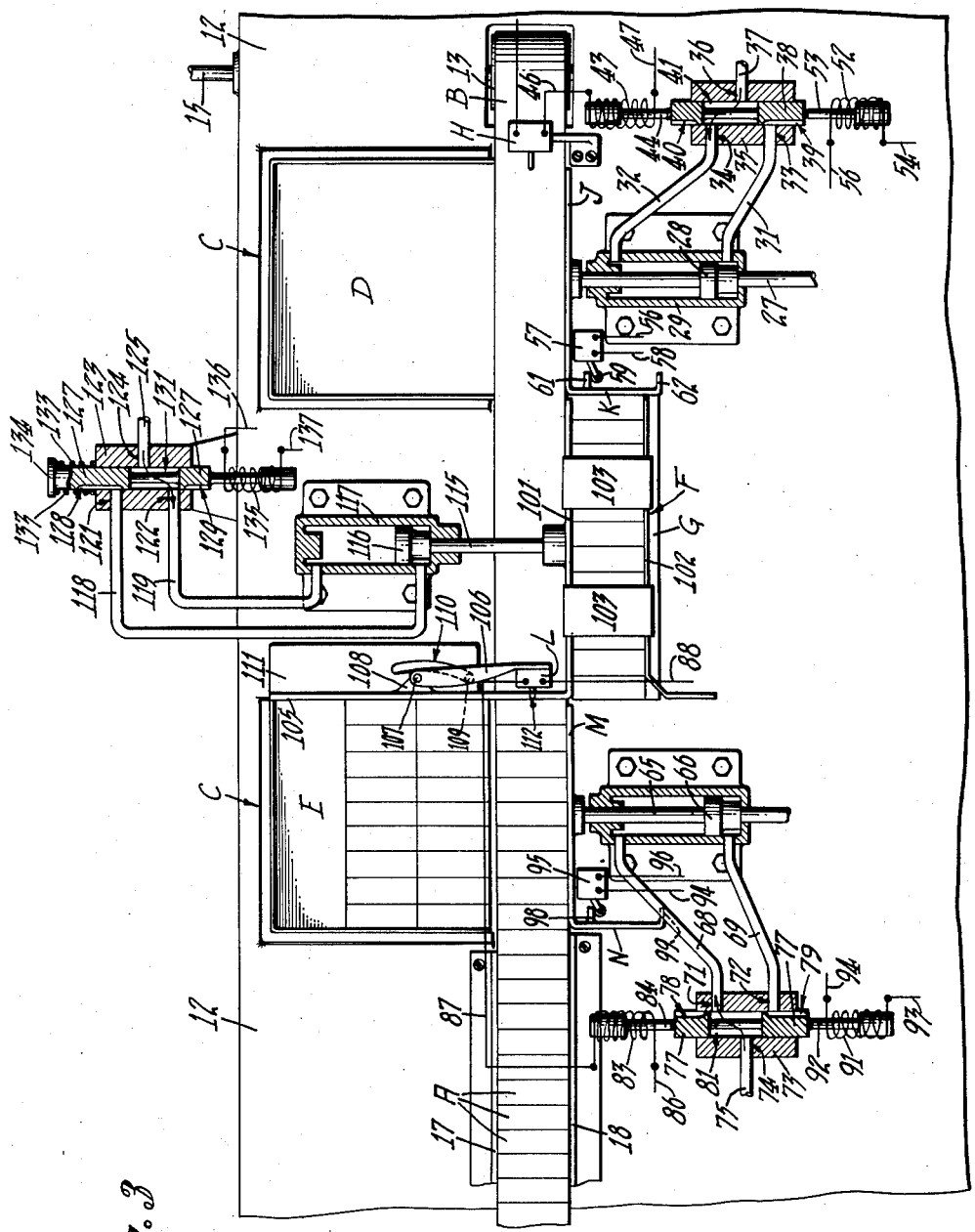
Figure 4:
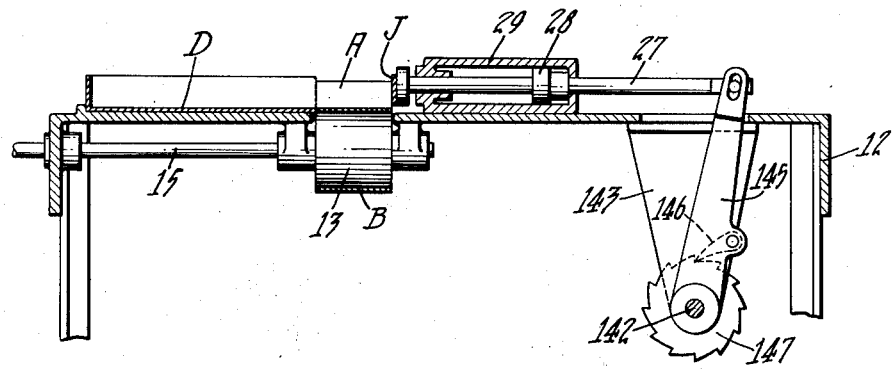
Figure 5:
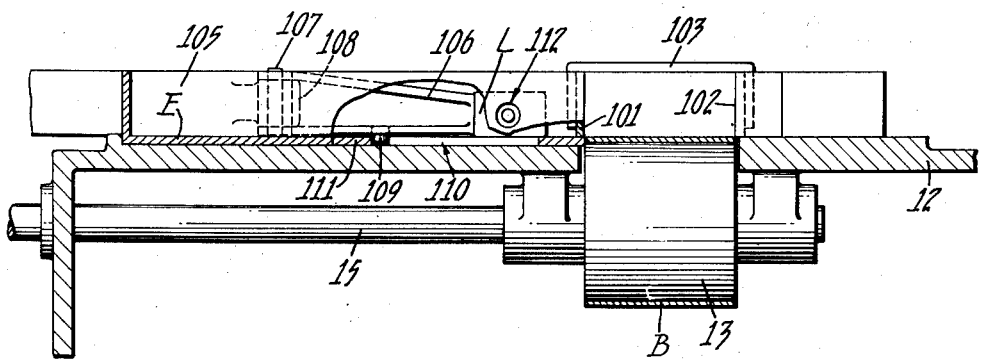
Figure 6:
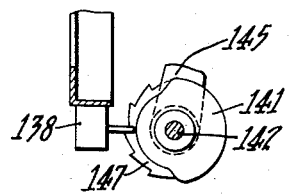

Referring to the drawings:

Figure 1 is a top plan view of a machine embodying the instant invention, with parts broken away and parts shown in section, the view also showing a wiring diagram of the electric apparatus used in the machine;

Figs. 2 and 3 are views similar to Fig. 1 with certain of the movable parts of the machine in different positions; and Figs. 4, 5 and 6 are vertical sectional views taken substantially along the lines 4—4, 5—5, 6—6 in Fig. 1.

As a preferred or exemplary embodiment of the instant invention the drawings disclose a machine for stacking or arranging in unit layers, articles A such as rectangular shaped fibre containers, preparatory to placing them in paper bags for shipment or storage. The containers A are received from any suitable source of supply, for example a container making machine, and enter the stacker preferably in a horizontal position and move in a substantially continuous straight line procession with the containers touching each other as best shown in Fig. 1.

The procession of containers A is supported on and is advanced through the stacking machine on the upper run of a continuously moving endless conveyor B which extends longitudinally of the machine for nearly its full length. Adjacent the path of travel of the conveyor B and disposed along the same side thereof, the machine is provided with a plurality of loading stations C at which the containers from the conveyor B are arranged in layer formation for transfer in any suitable manner into their shipping bags. The manner of transfer of the container layers into the bags, or the location of the latter at such time, constitutes no part of the present invention.

For simplicity in description the drawings show two of these stations C arranged in spaced relation. At these stations the machine is provided with horizontally disposed assembly tables D, E which are enclosed on three sides and are open on the side adjacent the conveyor B. Between the spaced assembly tables D, E, the machine is provided with a laterally movable runway section F which is slidable across the conveyor B to and from a support platform G disposed between the assembly tables on the opposite side of the conveyor B.

In a cycle of operation of the machine, the conveyor B carries the procession of containers A the full length of the machine, past the assembly table E, and movable runway section F, until a full, compact row of containers is located in front of the open side of the assembly table D. In this position of the procession of containers, the leading container A engages against and closes a normally open electric terminal switch H disposed in the path of travel of the containers. The closing of this switch sets in motion devices which operate a container transfer means in the form of a pusher plate J to push a row of containers A from the conveyor onto the assembly table D. A hold-back plate K extending outwardly from the pusher plate J preferably at right angles thereto moves into position across the conveyor on the forward stroke of the pusher plate J and holds the procession of containers back against advancement during the pushing operation.

As soon as the row of containers is received on the assembly table and the pusher plate J and its hold-back plate K are retracted clear of the conveyor, the procession of containers again advance until the leading container engages and again operates the switch H to repeat the operation of pushing another row of containers from the conveyor onto the assembly table D. The second row of containers pushes the first row farther along the assembly table. This operation is repeated until the assembly table D is filled with rows of containers as shown in Fig. 2 to complete a unit layer of containers.

When a unit layer of containers A has been assembled on the assembly table D and before the procession of containers on the conveyor B is again advanced, the movable runway section F between the assembly tables, is shifted outwardly towards the support platform G, from the position shown in Fig. 1 to the position shown in Fig. 3. This movement of the runway section F slides a row of containers, equal in length to the distance between the assembly tables, from the conveyor B onto the support platform G and simultaneously interposes a normally open electric terminal switch L into the path of travel of the procession of containers A on the conveyor B. This action establishes a new terminal point for loading the assembly table E and frees the conveyor B of all containers beyond the new terminal point so that the loading mechanism for the assembly table D will be rendered temporarily inactive without stopping the machine. During this period of inactivity of this loading station C, the assembled unit layer of containers on the assembly table D is removed in any suitable manner for transfer into a shipping bag or to any other suitable place of deposit as mentioned above.

At the new terminal point, the interposition of the terminal switch L into the path of travel of the containers, immediately brings the movable element of the switch into contact with the leading container of the portion of the procession remaining on the conveyor in front of the cut off containers on the support platform G, and thus the switch is immediately closed. The closing of the switch L sets in motion devices which operate a second container transfer means in the form of a pusher plate M, disposed in front of the open side of the assembly table E, to push a row of the containers A from the conveyor onto the assembly table E. The pusher plate M, like the pusher plate J is formed with a hold-back plate N to retard the advancement of the procession of containers during the pushing operation. In the same manner as explained above in connection with the assembly table D, the pushing operations for the assembly table E are repeated until the table is filled with a unit layer of containers.

Upon completion of the unit layer of containers on the assembly table E, the movable runway section F is shifted inwardly, i. e. returned to its original position as shown in Figs. 1 and 2. This return movement of the runway section F removes the switch L from the path of travel of the containers on the conveyor B and simultaneously returns the cut off row of containers from the support platform G to the conveyor, thus positioning the cut off row of containers in place immediately ahead of and in the procession of containers. The removal of the switch L eliminates the new terminal point and also renders the actuating devices for the pusher M temporarily inactive for the unloading of the unit layer of containers assembled on the assembly table E. This action also returns the terminal point to the switch H for the resumption of operations of the pusher plate J to reload the assembly table D.

In this manner the machine as a whole operates continuously and in synchronized manner alternately loads the assembly tables D, E with unit layers of containers and thus provides ample time for the unloading of one of the assembly tables while the other is being loaded. It also provides for the shifting of the terminal point of the procession of containers being continuously advanced by the conveyor B so that each assembly table may be properly loaded, and further provides for the cutting out of containers from the procession and the return of these containers to the procession to facilitate establishment of the different terminal points.

The tables D and E with the formed container layers thereon may be thus alternately and manually removed from the loading stations and successively filled into the shipping bags by an attendant. If desired a bag filling or packing machine of the general character disclosed in the patent to Socke et al. No. 2,524,846 dated October 10, 1950, may be used to advantage in conjunction with the instant disclosed machine.

Although only two assembly tables D, E and one intervening movable runway section F are shown in the drawings, it should be understood that any number of assembly tables arranged in spaced order with intervening runway sections may be used as required. The number of tables used will depend considerably upon the speed of the machine and the time required to unload the assembly tables.

A more detailed description and explanation of the actuating devices will now be given. The upper run of the conveyor B which carries and advances the procession of containers A, is supported by and travels over a flat horizontal top of a frame 12 which constitutes the main frame of the machine. The conveyor operates over a pair of spaced pulleys 13, 14 disposed one at each end of the frame 12 and carried on shafts 15, 16 journaled in suitable bearings formed in the frame. The shaft 15 is the driving shaft, and this shaft is actuated in any suitable manner in time with the other moving parts of the machine. Stationary guide rails 17, 18 secured to the frame 12 adjacent the path of travel of the conveyor B at the entrance end of the machine, retain the containers A in position of the moving conveyor.

The pusher plate J extends along the outer edge of the conveyor B for a distance substantially equal to the width of the open side of the assembly table D so that the row of containers engaged and pushed off the conveyor onto the assembly table is of a length substantially equal to the width of the assembly table. This pusher plate J is mounted, for movement across the conveyor B, on a piston rod 27 which carries a piston 28 disposed in a closed cylinder 29 secured to the top of the machine frame 12.

Reciprocation of the piston 28 within the cylinder 29 is effected preferably by compressed air introduced into the cylinder adjacent its ends and controlled by an electrically operated slide valve. For this purpose the interior of the cylinder 29 adjacent its ends is connected by a pair of air lines or pipes 31, 32 to respective outlet ports 33, 34 formed in a slide valve housing 35 secured to the machine frame 12. Opposite the outlet ports 33, 34, the valve housing 35 is formed with an inlet port 36 which is connected by a pipe 37 to any suitable source of supply of compressed air. Between the outlet ports 33, 34 and the inlet port 36 the valve housing 35 carries a slide valve 38 which extends through the housing and projects beyond both ends of the housing. At its ends the slide valve 38 is formed with vent channels 39, 40 which communicate with the outside atmosphere. Intermediate its ends the slide valve is formed with a relatively wide annular groove 41.

When the pusher plate J is in its normal position adjacent the path of travel of the containers on the conveyor B, as shown in Fig. 1, the slide valve 38 is in the position also shown in Fig. 1. In this position of the slide valve, its annular groove 41 is in communication with the inlet port 36 and the outlet port 34 and thus allows compressed air to flow from the inlet pipe 37, through the valve housing 35 and pipe 32 into the cylinder 29 to hold the piston 28 and the pusher plate J in the position shown in Fig. 1.

When a row of containers A on the conveyor B is to be pushed off onto the assembly table D, the slide valve 38 is shifted (outwardly and downwardly as viewed in Fig. 1) to cut off the cylinder pipe 32 from the source of compressed air and to relocate the annular groove 41 of the slide valve in communication with the inlet port 36 and the outlet port 33 as shown in Fig. 2. This relocation of the slide valve permits air under pressure to flow from the air pipe 37, through the valve housing 35 and cylinder pipe 31 into the cylinder 29 behind the piston 28 and thus forces the piston forward in the cylinder as shown in Fig. 2. This movement of the piston forces the pusher plate J inwardly against the containers on the conveyor B and pushes them from the conveyor onto the assembly table D. To facilitate this movement of the piston the relocated slide valve 38 positions its vent channel 40 opposite the valve outlet port 34 and thus permits the compressed air in the cylinder ahead of the piston to be pushed out into the outside atmosphere.

Reciprocation of the slide valve 38 in the valve housing 35 to relocate the slide valve for the forward stroke of the piston is effected preferably by a normally deenergized electric solenoid 43 having a movable core 44 which engages against the adjacent end of the slide valve and pushes the valve into its relocated position when the solenoid is energized. Energization of the solenoid 43 is effected by the closing of the switch H by the leading container A of the procession on the conveyor B as hereinbefore mentioned. For this purpose the solenoid and the switch are connected by a wire 46 (Fig. 1). The solenoid and the switch are also connected by respective wires 47, 48 to main lead wires 49, 50 which lead to and from a suitable source of electric current. When the switch H is closed, electric current passes along these wires to energize the solenoid 43.

For the return stroke of the pusher plate J, the slide valve 38 is returned to its normal position (as shown in Fig. 1) by a normally de-energized return solenoid 52 (Fig. 1) having a movable core 53 which engages against the adjacent opposite end of the slide valve for pushing the valve into place. One end of this solenoid 52 is connected by a wire 54 to the main lead wire 49. The other end of the solenoid is connected by a wire 56 to a normally open electric switch 57 disposed adjacent the pusher plate J. The switch in turn is connected by a wire 58 to the lead wire 50, thus completing a circuit.

The switch 57 is provided with a movable actuating element 59 which extends into the path of travel of a pair of spaced lugs 61, 62 formed on the hold-back plate K. The lug 62 engages and moves the element 59 when the pusher plate J completes its forward stroke and this movement of the element closes the switch 57 (see Fig. 2). This closing of the switch closes the electric circuit which it controls and thus electric current from the lead wires 49, 50 energizes the return solenoid 52 and hence returns the slide valve 38 to return the pusher plate J. When the pusher plate J reaches its normal returned position, the lug 61 on the hold-back plate K engages the movable element 59 of the switch 57 and thus reopens the switch to de-energize the return solenoid 52 to release the slide valve 38 for a repeat operation.

In a similar manner, the pusher plate M and its hold-back plate N are mounted and actuated for reciprocation across the conveyor B, through a forward or working stroke and thence through a return stroke. Like the pusher plate J, the pusher plate M extends along the outer edge of the conveyor B for a distance substantially equal to the width of the open side of the assembly table E so that the row of containers engaged and pushed off the conveyor onto this table is of a length substantially equal to the width of the assembly table. The pusher plate M is mounted on a piston rod 65 (Fig. 1) which carries a piston 66 disposed in a closed cylinder 67 secured to the top of the machine frame 12.

The piston 66 is reciprocated within the cylinder 67 by compressed air admitted into the cylinder by way of air lines or pipes 68, 69 connecting with the interior of the cylinder adjacent its ends. The pipes 68, 69 lead from outlet ports 71, 72 formed in a slide valve housing 73 secured to the machine frame 12. Opposite the outlet ports 71, 72, the valve housing 73 is formed with an inlet port 74 which is connected by a pipe 75 to any suitable source of supply of compressed air. Between the outlet ports 71, 72 and the inlet port 74 the valve housing 73 carries a slide valve 77 which extends through the housing and projects beyond both of its ends. At its ends the slide valve 77 is formed with vent channels 78, 79 which communicate with the outside atmosphere for venting the cylinder. Intermediate its ends the slide valve is formed with a relatively wide annular groove 81.

The movement of the slide valve 77 within the valve housing 73 to reciprocate the piston 66 and the pusher plate M at the proper time is effected in a manner similar to the movement of the slide valve 38 which controls the reciprocation of the pusher plate J. For this purpose the forward stroke of the pusher plate M is controlled by a normally de-energized electric solenoid 83 surrounding a movable core 84 which engages against the adjacent end of the slide valve 77 and pushes the valve into a relocated position when the solenoid is energized.

One end of the solenoid 83 is connected by a wire 86 to the main lead wire 49. The other end of the solenoid is connected by a wire 87 to the terminal switch L. The switch in turn is connected by a wire 88 to the other main lead wire 50. Hence when the switch L is closed as hereinbefore mentioned electric current flows along this circuit and energizes the solenoid 83 to shift the slide valve 77.

The return stroke of the pusher plate M is controlled by a normally de-energized return solenoid 91 having a movable core 92 which engages against the adjacent opposite end of the slide valve for returning the valve to its original or normal position. One end of this return solenoid is connected by a wire 93 to the main lead wire 49. The opposite end of the solenoid is connected by a wire 94 to a normally open electric switch 95 disposed adjacent the pusher plate M. The switch in turn is connected by a wire 96 to the other main lead wire 50, thus completing the circuit. The switch 95 is provided with a movable actuating element 97 which extends into the path of travel of a pair of spaced lugs 98, 99 formed on the hold-back plate N. These lugs 98, 99 close and reopen the switch 95 to energize and deenergize the return solenoid 91 in the same manner as described above in connection with the lugs 61, 62 on the hold-back plate K.

Reference should now be had to the movable runway section F which is interposed between the two assembly tables D, E. This runway section F comprises a pair of spaced and parallel guide rails 101, 102 (Figs. 1 and 5) which extend parallel with the conveyor B and which are tied together by a pair of inverted U-shaped straps 103 to provide a unitary structure. The guide rail 101 is formed with a right angled extension 105 which extends back along one side of the assembly table E and forms one enclosing wall of the table.

The rail extension 105 supports the terminal switch L. For this purpose, the switch L is secured to the free end of a lever 106 which is mounted on a pivot pin 107 carried in a lug 108 projecting outwardly from the extension 105. Intermediate its ends, the lever 106 carries a depending cam roller 109 which operates in a curved cam groove 110 formed in an extended portion 111 of the assembly table E. The movable element of the switch L projects into an opening 112 formed in the rail extension 105.

Hence when the runway section F shifts forward to cut a row of containers A from the procession on the conveyor B as hereinbefore explained, the rail extension 105 moves forward with the section to hold back the procession of containers left on the conveyor and to simultaneously advance the terminal switch L to its active position in the path of travel of the containers as shown in Fig. 3. During this advancement of the terminal switch L, the cam roller 109 traverses the cam groove 110. The cam groove is shaped to hold the advancing switch L in a position where the outer end of its movable element in the opening 112 is protected by the rail extension 105 until the end of the movable element is well beyond the adjacent edge of the leading container A in the procession. In this manner the movable element is prevented from laterally catching onto the container and causing damage to the element and the container.

When once beyond this danger point the cam swings the switch L toward the leading container and thus projects the movable element of the switch beyond its protecting rail extension 105 and into engagement with the side of the leading container for closing the switch to reenergize the solenoid 83 which in turn actuates the slide valve 77 and operates the pusher plate M as hereinbefore explained. For repeated operations of the pusher plate M the switch L remains in its advanced position and its movable element is engaged as the procession of containers advances into contact with its as in the case of the switch H at the assembly table D. When the movable runway section F is returned to its normal position, the cam 110 acts to retract the movable element of the switch L into its protected position within the opening 112 for the next advancement of the switch.

Shifting of the runway section F across the conveyor B, to and from the support platform G as hereinbefore outlined is effected by devices and operations similar to those above described in connection with the pusher plates J and M. For this purpose the guide rail 101 of the runway section is mounted on a piston rod 115 (Fig. 1) which carries a piston 116 disposed in a closed cylinder 117 secured to the top of the machine frame 12.

The piston is reciprocated within the cylinder 117 by compressed air admitted into the cylinder by way of air lines or pipes 118, 119 connecting with the interior of the cylinder adjacent its ends. The pipes 118, 119 lead from outlet ports 121, 122 formed in a slide valve housing 123 secured to the machine frame 12. Opposite the outlet ports 121, 122, the valve housing 123 is formed with an inlet port 124 which is connected by a pipe 125 to any suitable source of supply of compressed air. Between the outlet ports 121, 122 and the inlet port 124 the valve housing 123 carries a slide valve 127 which extends through the housing and projects beyond both of its ends.

At its ends the slide valve 127 is formed with vent channels 128, 129 which communicate with the outside atmosphere for venting the cylinder. Intermediate its ends the slide valve is formed with a relatively wide annular groove 131.

The movement of the slide valve 127 within the valve housing 123 to shift the piston 116 and the runway section F at the proper time is effected in a manner similar to the movement of the slide valves 38, 77 which controls the reciprocation of the pusher plates J and M respectively. For this purpose, the slide valve 127 and hence the piston 116, are held in their normal positions as shown in Figs. 1 and 2, by a compression spring 133 which surrounds one projecting end of the slide valve. The spring is interposed between the end of the valve housing 123 and a cap 134 carried on the outer end of the slide valve. The opposite end of the slide valve 127 is disposed within a normally de-energized electric solenoid 135 which controls the shifting of the slide valve into the position shown in Fig. 3 against the resistance of the spring 133 for admitting compressed air into the proper end of the cylinder to shift the runway section F into the position shown in Fig. 3.

One end of the solenoid 135 is connected to the source of electric current by way of a wire 136 which connects with the main lead wire 50. The other end of the solenoid is connected by a wire 137 to a control switch 138 which in turn is connected by a wire 139 to the main lead wire 49, thus completing the circuit.

The control switch 138 controls the energizing and the de-energizing of the solenoid 135 and for this purpose is closed and opened by a rotatable edge cam 141 against which the movable element of the switch engages as best shown in Figs. 1 and 6. The cam 141 is intermittently rotated by the movements of the pusher plate piston rods 27, 65 and is shaped to hold the control switch 138 open during the repeated reciprocations of the piston rod 27 and conversely to close and hold the switch closed during the repeated reciprocations of the piston rod 65. For this purpose the edge cam 141 is mounted on an intermittently rotatable cam shaft 142 which is carried in a pair of spaced bearing brackets 143 (see also Fig. 4) which depend from the top of the machine frame 12.

The cam shaft 142 extends parallel with the conveyor B in substantial alignment with the outer ends of the two piston rods 27, 65 for a distance slightly greater than the distance between the piston rods. The outer end of the piston rod 27 is connected to the upper end of a ratchet arm 145 (Fig. 4) which is loosely carried on the cam shaft 142 and which carries a ratchet pawl 146 which engages with teeth of a ratchet wheel 147 tightly secured to the cam shaft. In a similar manner, the outer end of the piston rod 65 is connected to the upper end of a ratchet arm 151 (Fig. 1) which is loosely carried on the cam shaft 142 and which carries a ratchet pawl 152 which engages with teeth of a ratchet wheel 153 tightly secured to the cam shaft.

Hence when the piston rod 27 reciprocates repeatedly as it does to operate the pusher plate J through the required number of strokes to fill the assembly table D with rows of containers A, the piston rod repeatedly rocks the ratchet arm 145 and thus through its pawl 146, intermittently rotates the ratchet wheel 147 through a series of partial rotations which turns the edge cam 141 through an equal number of partial rotations. Since the drawings show only two assembly stations, the ratchet wheels and the edge cam will rotate through one half a revolution for each station. For three stations the cam would be rotated through one third of a revolution for each station, etc.

As the piston rod 27 moves through the last forward stroke of its series which fills the assembly table D with rows of contains to complete a unit layer, the cam 141 in rotating through its partial rotation completes one half of its cycle of operation and closes the control switch 138 and thus energizes the solenoid 135. The energized solenoid 135 shifts the slide valve 127 from the position shown in Figs. 1 and 2 into the position shown in Fig. 3 and thus effects the forward movement of the runway section F to cut out the containers on the conveyor between the assembly tables and to position the terminal switch L for the loading of the assembly table E, as hereinbefore explained.

This action renders the pusher plate J and its piston rod 27 temporarily inoperative because of the lack of containers on the conveyor B to actuate the terminal switch H. However, the containers on the conveyor immediately ahead of the terminal switch L, by engaging the switch L, sets in motion the pusher plate M and its piston rod 65. The piston rod 65 thereupon during its repeated operations takes over the rotation of the cam 141, and through the rocker arm 151, pawl 152, and ratchet wheel 153, intermittently rotates the cam through the second half of its cycle of operation during the loading of the assembly table E.

As the piston rod 65 moves through the last forward stroke of its series which fills the assembly table E, the cam 141 in completing its cycle of operation defined by a single revolution thereof, opens the control switch 138 and thus de-energizes the solenoid 135. The de-energized solenoid thus releases the slide valve 127 and its compression spring 133 thereupon returns the valve to its original position as shown in Fig. 1. This movement of the valve actuates compressed air piston 116 to withdraw the terminal switch L to render the pusher plate M inoperative, and simultaneously returns the movable runway section F to thereby return the shifted cut out row of containers A from the support platform G to the conveyor B for renewed advancement with the conveyor toward the terminal switch H to re-establish operation of the pusher plate J for a reloading of the assembly table D. The cam 141 thereupon starts a new cycle of operation as hereinabove explained.

In this manner the cam 141 is actuated through one half its cycle of operation by the devices which load the assembly table D and then through the other half of its cycle of operation by the devices which load the assembly table E, to control the shifting of the runway section F in accordance with the assembly table to be loaded, so that the tables may be alternately or successively loaded to provide time for the unloading of one table while the other is being loaded.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for assembling articles in layers for packaging, comprising a conveyor for propelling articles to be assembled along a path of travel, a pair of spaced assembly tables disposed adjacent one side of said path of conveyor travel for alternately receiving a plurality of rows of said articles from said conveyor, assembly means disposed adjacent the opposite side of said path of conveyor travel in respective alignment with each of said tables, separate means for actuating said assembly means in succession for transferring succeeding rows of said articles from said conveyor to said tables to build up a layer of articles on each of said tables in succession, means movable across said conveyor between said tables for removing from said conveyor the articles intervening between said tables, and means for actuating said movable means in time with the actuation of said assembly means for shifting said intervening articles subsequent to the loading of one of said tables and prior to loading of another of said tables.

2. A machine for assembling articles in layers for packaging, comprising a conveyor for propelling articles in a substantially continuous procession along a path of travel, a pair of spaced assembly tables disposed adjacent one side of said path of travel for receiving said articles, a pair of pusher plates disposed adjacent the opposite side of said path of travel and in alignment with said assembly tables, separate actuating means for each of said pusher plates for pushing rows of articles from said conveyor onto said tables, fixed terminal means disposed adjacent one of said assembly tables in the path of travel of said articles on the conveyor and operable by the leading article in the procession for operating one of said actuating means through a working stroke of its associated pusher plate, movable terminal means disposed adjacent the other of said assembly tables and interposable into the path of travel of said articles on the conveyor and operable by the articles in the procession for operating the other of said actuating means through a working stroke of its associated pusher plate, means operable by said pusher plates for operating said actuating means through a return stroke of said pusher plates, means for interposing said movable terminal into the path of travel of said articles on said conveyor for the loading of the associated assembly table, and timing means connected with and operable by both of said pusher plate actuating means for timing the interposition and the withdrawal of said movable terminal means relative to the procession of articles on said conveyor.

3. A machine for assembling articles in layers for packaging, comprising a conveyor for propelling articles in a substantially continuous procession along a path of travel, a pair of spaced assembly tables disposed adjacent one side of said path of travel for receiving said articles, a pair of pusher plates disposed adjacent the opposite side of said path of travel and in alignment with said assembly tables, separate actuating means for each of said pusher plates for pushing rows of articles from said conveyor onto said tables, fixed terminal means disposed adjacent one of said assembly tables in the path of travel of said articles on the conveyor and operable by the leading article in the procession for operating one of said actuating means through a working stroke of its associated pusher plate, movable terminal means disposed adjacent the other of said assembly tables and interposable into the path of travel of said articles on the conveyor and operable by the articles in the procession for operating the other of said actuating means through a working stroke of its associated pusher plate, means operable by said pusher plates for operating said actuating means through a return stroke of said pusher plates, a movable runway section disposed adjacent said conveyor and located between said assembly tables and providing a support for said movable terminal means, actuating means for shifting said runway section laterally of said conveyor to remove therefrom the articles between the assembly tables to cease feeding articles to said fixed terminal means and to interpose said movable terminal means into operating position, and timing means connected with and operable by said pusher plate actuating means for controlling the operation of said runway section actuating means.

4. A machine for assembling articles in layers for packaging, comprising a conveyor for propelling articles in a substantially continuous procession along a path of travel, a pair of spaced assembly tables disposed adjacent one side of said path of travel for receiving said articles, a pair of pusher plates disposed adjacent the opposite side of said path of travel and in alignment with said assembly tables, separate actuating means for each of said pusher plates for pushing rows of articles from said conveyor onto said tables, fixed terminal means disposed adjacent one of said assembly tables in the path of travel of said articles on the conveyor and operable by the leading article in the procession for operating one of said actuating means through a working stroke of its associated pusher plate to load one of said assembly tables, a movable runway section disposed adjacent said conveyor and between the spaced assembly tables and having a rail extension extending along one side of the other of said assembly tables, actuating means connected with said runway section for shifting said section transversely of said conveyor to remove therefrom the articles between the assembly tables to cease feeding articles to said loaded table, a terminal arm pivotally mounted on said rail extension, a stationary cam for oscillating said arm into and out of operating position, movable terminal means carried on said arm and interposable by said cam and said runway section into the path of travel of the articles remaining on said conveyor and operable by the leading article in the procession for operating the other of said actuating means through a working stroke of its associated pusher plate to load said other assembly table, means operable by said pusher plates for operating said actuating means through a return stroke of said pusher plates, and timing means connected with and operable by said pusher plate actuating means for controlling the operation of said runway section actuating means.

5. A machine for assembling articles in layers for packaging, comprising a conveyor for propelling articles in a substantially continuous procession along a path of travel, a pair of spaced assembly tables disposed adjacent one side of said path of travel for receiving said articles, a pair of pusher plates mounted on piston rods disposed adjacent the opposite side of said path of travel and in alignment with said assembly tables, fluid actuating means for each of said piston rods for pushing rows of articles from said conveyor to load said tables successively, valve means connecting with said fluid actuating means for controlling the reciprocation of said piston rods, electric means connected with said valve means and operable by said pusher plates and by the articles on said conveyor for controlling the operation of said valve means, a movable runway section disposed between said spaced assembly tables and extending along said conveyor for removing articles from said conveyor to cease loading one of said assembly tables and to start loading the other, fluid actuating means connected with said runway section for shifting said section transversely of said conveyor, valve means for controlling the shifting of said runway section, electric means for controlling the operation of said runway valve means, a rotatable cam for actuating said runway valve electric means, a cam shaft for said cam, and ratchet means connecting said cam shaft with said pusher plate piston rods for rotating said cam in time with said pusher plates to shift said runway section after one of said assembly tables is loaded and to return said runway section after the other of said assembly tables is loaded to provide for successive loading of said tables so that unloading of one table may be effected while the other is loading.

6. A machine for assembling articles in layers for packaging, comprising a conveyor for propelling closely juxtaposed articles in a continuous procession along a path of travel, a plurality of spaced loading stations disposed adjacent said conveyor for respectively receiving successive rows of articles therefrom, a plurality of movable transfer means disposed in spaced relation adjacent said conveyor respectively in alignment with said loading stations, means engageable by the leading article on said conveyor for actuating one of said transfer means to laterally shift successive rows of leading articles from said conveyor to one of said loading stations to progressively build up a unit layer of articles thereon, and movable means actuated by said one transfer means to project over said conveyor into the path of succeeding juxtaposed articles thereon after said unit layer has been formed, said movable means when so projected being engageable by a leading article in the succeeding procession thereof to actuate another of said transfer means to laterally shift successive article rows from said conveyor to another loading station to progressively build up a succeeding unit layer of articles thereon.

7. A machine for assembling articles in layers for packaging, comprising a conveyor for propelling closely juxtaposed articles in a continuous procession along a longitudinal path of travel, a pair of spaced forward and rearward loading stations disposed adjacent one side of said conveyor for respectively receiving successive rows of articles therefrom, a pair of transversely reciprocable pusher members disposed in spaced relation adjacent the opposite side of said conveyor respectively in alignment with said loading stations, means engageable by the leading article on said conveyor for actuating the forwardly disposed pusher member to laterally shift successive rows of leading articles from said conveyor to said forward loading station to progressively build up a unit layer of articles thereon, and a movable control member actuated by said forward reciprocating pusher member to project over said conveyor into the path of succeeding juxtaposed articles thereon after said unit layer has been formed at said forward loading station, said control member when so projected being engageable by a leading article in the succeeding procession thereof on said conveyor to actuate the rearward of said pusher members to laterally shift successive juxtaposed article rows from said conveyor to said rearward loading station to progressively build up a succeeding unit layer of articles thereon.

8. A machine for assembling articles in layers for packaging, comprising a conveyor for propelling closely juxtaposed articles in a continuous procession along a path of travel, a plurality of spaced loading stations disposed adjacent said conveyor for respectively receiving successive rows of articles therefrom, a plurality of movable transfer means disposed in spaced relation adjacent said conveyor respectively in alignment with said loading stations, means engageable by the leading article on said conveyor for actuating one of said transfer means to laterally shift successive rows of leading articles from said conveyor to one of said loading stations to progressively build up a unit layer of articles thereon, a movable article runway disposed between said loading stations and having means for maintaining the same in normal registry with said conveyor for the unobstructed passage of articles therethrough during the formation of said unit article layer, said movable runway having a control member thereon normally disposed out of the path of travel of articles advanced by said conveyor through said runway, and means actuated by said one transfer means to move said runway and the articles confined therein transversely of said conveyor after said unit layer has been formed to temporarily divert and isolate such confined articles while arresting further advance of articles on said conveyor, the movement of said runway shifting said control member thereon into the path of advancing articles arrested by said runway, whereby said control member is engaged by a leading article in the succeeding procession thereof to actuate another of said transfer means to laterally shift successive article rows from said conveyor to another loading station to progressively build up a succeeding unit layer of articles thereon.

9. A machine for assembling containers in alternately formed spaced unit layers for subsequent packaging, comprising a conveyor for propelling closely juxtaposed containers in a continuous procession along a longitudinal path of travel, a pair of spaced forward and rearward loading stations disposed adjacent one side of said conveyor for respectively receiving successive rows of containers therefrom, a pair of transversely reciprocable pusher members disposed in spaced relation adjacent the opposite side of said conveyor respectively in alignment with said loading stations, means engageable by the leading container on said conveyor for actuating the forwardly disposed pusher member to laterally shift successive rows of containers from said conveyor to said forward loading station to progressively build up a unit layer of containers thereon, a movable container runway disposed between said loading stations and having means for maintaining the same in normal registry with said conveyor for the unobstructed passage of containers therethrough during the formation of said unit container layer, said movable runway having a control member thereon normally disposed out of the path of travel of containers advanced by said conveyor through said runway, and a movable control member actuated by said forward reciprocating pusher member to move said runway and the containers confined therein transversely of said conveyor after said unit layer has been formed to temporarily divert and isolate such confined containers while arresting further advance of containers on said conveyor, the movement of said runway shifting said control member thereon into the path of advancing containers arrested by said runway, whereby said control member is engaged by a leading container in the succeeding procession on said conveyor to actuate the rearward of said pusher members to laterally shift successive container rows from said conveyor to said rearward loading station to progressively build up a succeeding unit layer of containers thereon.

10. In a machine for alternately assembling spaced unit layers of articles for subsequent packaging, comprising a continuously movable conveyor for advancing the articles in processional order and contiguous relation along a straight line path of travel, a pair of first and second loading stations arranged in spaced relation on one side of said conveyor, a movable runway member mounted for transverse movement toward and away from said conveyor between said loading stations, a pair of movable transfer members disposed in spaced relation on the opposite side of said conveyor in respective transverse alignment with said loading stations, said transfer and runway members each including valve controlled fluid pressure means to reciprocate said members in timed relation over and transversely of said conveyor to successively shift rows of contiguous articles thereon into said loading stations respectively by said transfer members and to temporarily divert from and thereafter to return to said conveyor a plurality of intermediate articles contained within said runway, a fixed electric switch mounted in the path of the advancing articles on said conveyor at the remote end of said first loading station and a movable electric switch mounted on said runway at the remote end of said second loading station and disposed out of the path of the articles advancing through said runway to said first loading station, whereby the leading article on said conveyor first engages said fixed electric switch to actuate said fluid pressure means to reciprocate one of said transfer means to successively shift rows of contiguous articles on said conveyor into said first loading station to progressively build a unit article layer therein, said fluid pressure means being responsive to successive movements of said one transfer means to move said runway and its confined articles out of the path of conveyor travel and arrest further article advance through said runway to said first loading station while simultaneously projecting said movable switch into the path of travel of succeeding articles advanced by said conveyor, the leading of said succeeding advancing articles thereafter engaging said movable electric switch to actuate said fluid pressure means to reciprocate the other transfer means to successively shift rows of contiguous articles on said conveyor into said second loading station to progressively build up a unit article layer therein, said fluid pressure means being thereafter responsive to successive movements of said other transfer means to return said movable runway member and its confined articles to said conveyor preparatory to the formation of a succeeding unit article layer at said first loading station.

11. In a machine for continuously assembling articles in alternate unit layers for subsequent packaging, the combination of a conveyor for advancing the articles in a continuous procession to a plurality of loading stations arranged in spaced relation at one side thereof, transfer means at each of said stations for moving successive rows of articles thereinto from said conveyor, an article runway disposed between said stations and having means for moving the same into and out of registry with said conveyor, means at the forward loading station engageable by an article on said conveyor for actuating one of said transfer means while said runway is in registry with said conveyor and the articles being advanced thereby, means responsive to the movement of said one transfer means for moving said runway out of registry with said conveyor to arrest further advance of articles to said forward loading station, and means carried by said runway and projected by movement of the latter into position to be engaged by a succeeding article on said conveyor for actuating another transfer means at a rearward loading station for the purpose described.

References Cited in the file of this patent

UNITED STATES PATENTS

| | | |
|---|---|---|
| 744,874 | Neeland | Nov. 24, 1903 |
| 1,881,514 | Keller et al. | Oct. 11, 1932 |
| 2,029,558 | Chalmers | Feb. 4, 1936 |
| 2,038,758 | Paxton | Apr. 28, 1936 |
| 2,057,131 | Barton et al. | Oct. 13, 1936 |
| 2,470,795 | Socke | May 24, 1949 |